Oct. 11, 1955

J. ISREELI ET AL 2,720,344

LIQUID FUEL METERING DISTRIBUTORS
FOR INTERNAL COMBUSTION ENGINES

Filed May 21, 1953

INVENTORS.
J. Isreeli + J. N. Morris
BY
Churchill, Rich, Weymouth + Engel
Attys.

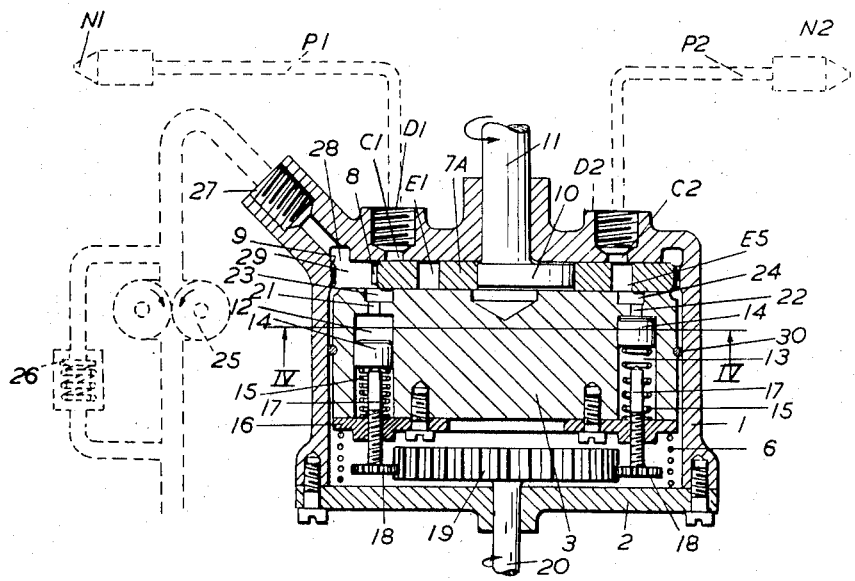
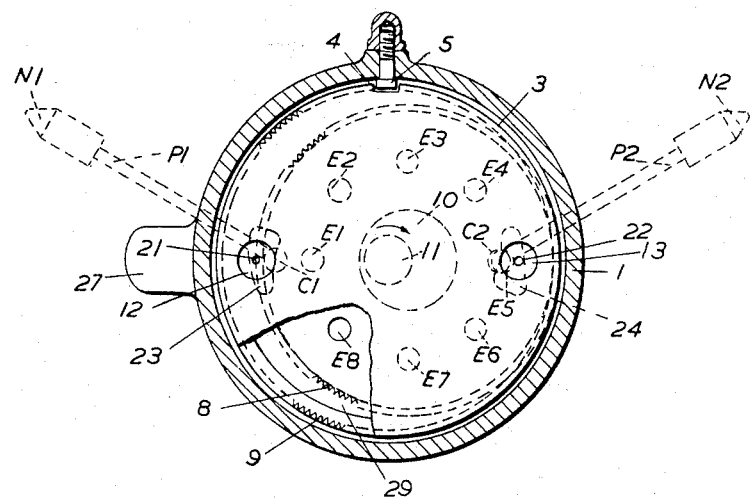

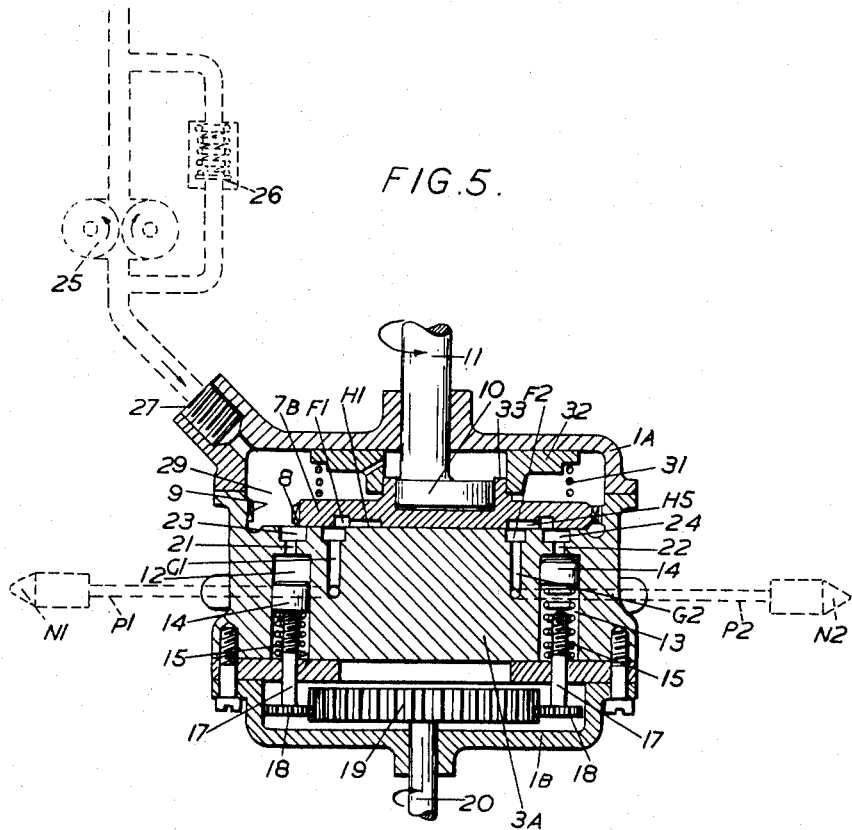

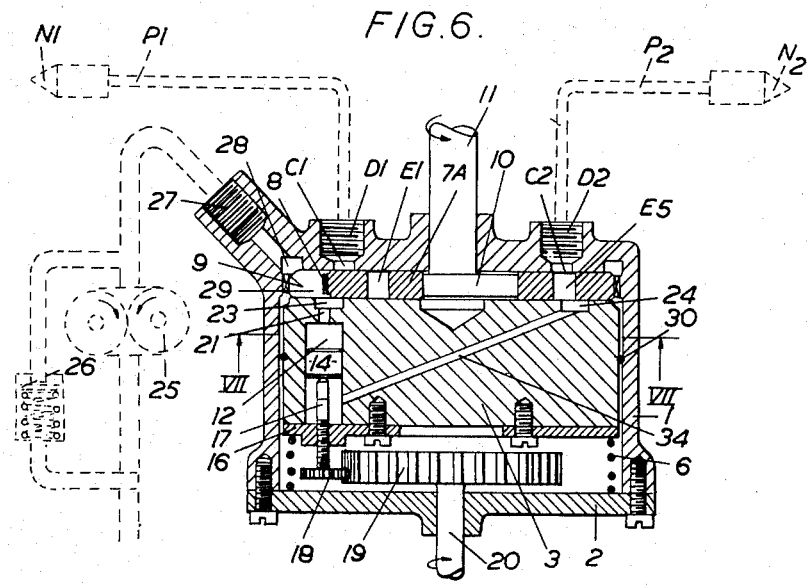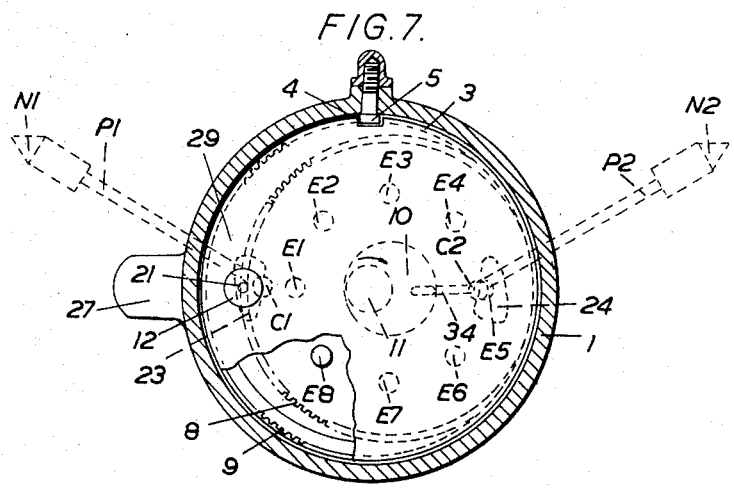

United States Patent Office 2,720,344
Patented Oct. 11, 1955

2,720,344

LIQUID FUEL METERING DISTRIBUTORS FOR INTERNAL COMBUSTION ENGINES

Jack Isreeli, Tuckahoe, N. Y., and John Neville Morris, Birmingham, England, assignors of one-half to The S. U. Carburetter Co. Ltd., Birmingham, England, a British company, and one-half to Simmonds Aerocessories, Inc., Tarrytown, N. Y., a corporation of New York Application May 21, 1953, Serial No. 356,418

Claims priority, application Great Britain May 21, 1952

12 Claims. (Cl. 222—250)

This invention relates to liquid-fuel metering distributors for internal combustion engines.

The fact that reciprocatory fuel-injection pumps made in accordance with United States Patent No. 2,329,912 have been used quite extensively in aircraft is sufficient indication of their effectiveness and reliability. The success of those pumps is undoubtedly attributable primarily to the incorporation of a ported distributing valve of the rotary disc type, to which an epicyclic motion is imparted continuously during operation. As a result, a lapping action takes place between the valve and its cooperating stationary facings, which minimizes any scoring of the rubbing surfaces that may arise and ensures the maintenance of an extremely accurate planar contact between those surfaces, with consequent avoidance of leakages at the ports controlled by the valve.

Although entirely satisfactory operationally, the fuel-injection pumps referred to above are rather costly to produce because their design entails the provision of several individual pump chambers the plungers of which are actuated by a precision-built, adjustable swash-plate mechanism.

The aim of the present invention is to provide fuel-feeding equipment capable of functioning just as satisfactorily as the aforesaid pumps, but possessing the advantage of being very much cheaper to produce. To this end, the essential feature of employing a ported epicyclic distributing valve is retained in the improved liquid-fuel metering distributor but the multiple pump chambers with their associated swash-plate mechanism are dispensed with entirely. Instead, under the control of the ported epicyclic distributing valve, a distensible metering chamber, of adjustable volumetric capacity, is charged periodically with pressurized fuel from any convenient source of supply and, at recurrent intervals, by spring-loading or fluid-pressure is caused abruptly to contract and thereby rapidly eject its fuel content to a delivery outlet. The distensibility of the metering chamber is preferably afforded by a free piston or plunger which, if single-acting, may be either spring-loaded or hydraulically-loaded so as to tend to contract the volume of the chamber. Alternatively, the metering chamber plunger may be rendered double-acting by making provision whereby, under the control of the epicyclic distributing valve, the pressurized fuel is admitted alternately at opposite sides of the plunger, so that the latter is impelled to eject the metered fuel from opposite ends of the metering chamber in turn. In both cases the plunger has associated with it an adjustable stop which protrudes from an end wall of the chamber in fluid-tight fashion and determines the effective volumetric capacity. Ordinarily, however, there will be not merely one distensible metering chamber but two or more of them exactly alike, each serving its own associated injection nozzle or more than one of such nozzles in correct sequence as determined by the porting of the distributing valve. Provision is made whereby the respective metering chambers possess concurrently the same degree of distensibility at any given time.

Examples of liquid-fuel metering distributors in accordance with the present invention are illustrated in the accompanying drawings, in which:

Figure 3 is a diametrical sectional view of a similar unit, but in which each metering chamber serves only one discharge point;

Figure 4 is a section on the line IV—IV in Figure 3;

Figure 5 is a diametrical sectional view of a third design, which can be regarded as a modification of the first one;

Figure 6 is a diametrical sectional view of a modification of the unit shown in Figures 3 and 4; and Figure 7 is a section on the line VII—VII in Figure 6.

Figure 1:
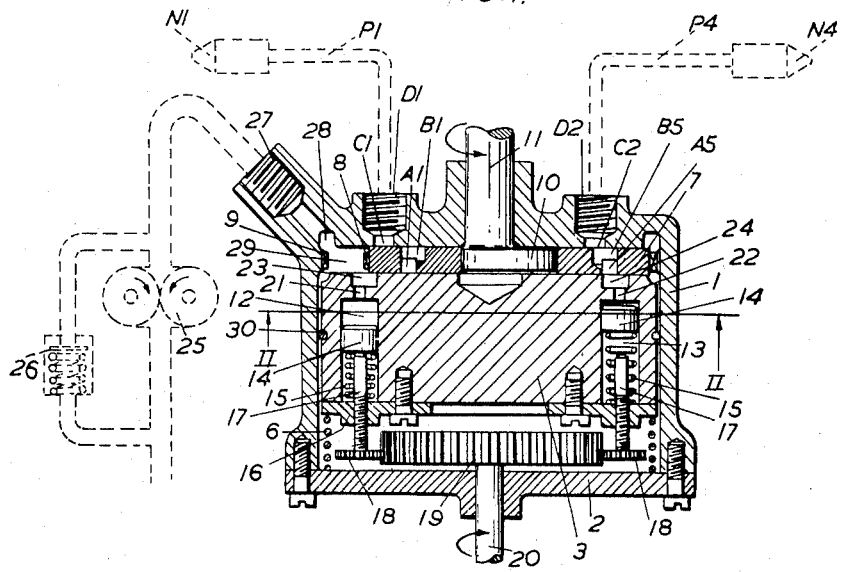
Figure 1 is a diametrical sectional view of one design of unit, having a pair of metering chambers each of which serves two discharge points.
Figure 2:
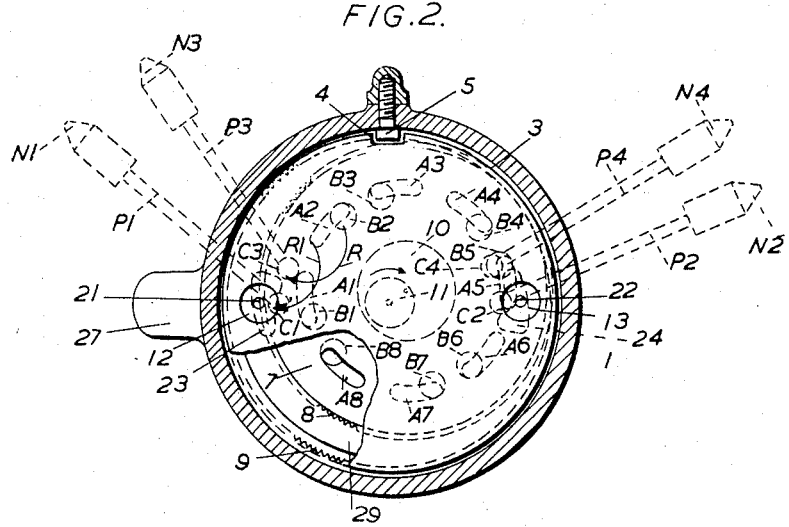
Figure 2 is a section on the line II—II in Figure 1.

The unit represented in Figures 1 and 2 has a casing 1 of generally cylindrical form, which is fitted at one end with a detachable cover plate 2 and accommodates a coaxial cylindrical metering block 3. This block is restrained from rotation, e. g. by providing it with a keyway 4 (Fig. 2) engaged by a key 5 held in the casing. Under the thrust exerted by a helical compression spring 6 on the metering block 3, a disc-like epicyclic distributing valve 7, having accurately flat faces, is nipped between equally accurate facings on the integral end wall of the casing and the adjacent end of the metering block 3 respectively, so that the coacting surfaces are maintained in intimate contact. The valve 7, the periphery of which is formed with gear teeth 8 which mesh with a stationary ring gear 9 on the internal surface of the casing 1, has an epicyclic motion imparted to it by an eccentric 10 fixed to a driving shaft 11.

The metering block 3 has a pair of diametrically opposed metering chambers 12 and 13 of cylindrical form, each containing a free piston or plunger 14 provided with a return spring 15 which bears against a fixed plate 16 detachably secured to the block 3. The travel of each of the pistons 14, and hence the degree of distensibility of the respective metering chambers, is regulated by a screwed stop 17 which protrudes from the plate 16 in fluid-tight fashion and carries a narrow pinion 18 meshing with a wider spur gear 19 fast on a driving spindle 20. Rotation of this spindle consequently effects concurrent axial movement of the two stops 17 to the same extent.

By means of drillings 21 and 22 respectively, the metering chambers 12 and 13 are put in communication with corresponding ports 23 and 24 in the facing of the metering block 3. These ports, which are recesses of tapered arcuate shape as indicated in Figure 2, cooperate with eight equispaced arcuate ports A1 . . . A8 formed as recesses in the valve 7 and concentric with it. The fact that there are eight of these ports in this particular example is merely incidental, the actual number required depending upon the operational circumstances. Also, it may be mentioned that the arcuate formation of the inner and outer radial boundaries of the respective sets of ports ensures rapidity of opening. Communciating with the ports A1 . . . A8 are corresponding drilling B1 . . . B8 which are made in that face of the valve 7 which is in contact with the facing on the end wall of the casing 1. From that facing, four delivery passages C1 . . . C4 terminate in final outlets D1 . . . D4 (omitted from Figure 2 for the sake of clarity), from which pipe connections P1 . . . P4 lead to injection nozzles N1 . . . N4 respectively. As can be seen from Figure 2, the drillings B1 . . . B8 are located at alternate adjacent ends of the ports A1 . . . A8.

An extraneous pump 25 of any convenient type, provided with a by-pass relief valve 26, is employed to deliver a pressurized supply of liquid fuel to an inlet 27 and thence to a gallery 28 which opens into the crescent-shaped space 29 around the valve 7.

The metering block 3 is grooved to receive a synthetic rubber O-ring 30 which acts as a seal in the clearance between the block and the casing 1. This sealing ring is such as not to give rise to excessive frictional resistance to the relative longitudinal movement of the two components, and thus to enable the loading provided by the spring 6 to be at all times effective in maintaining the valve 7 in contact with its coacting seating surfaces.

Assuming the eccentric 10 to be rotated by the shaft 11 in the direction indicated, and the valve 7 to be momentarily in the situation depicted; then, since the metering block port 23 has already been exposed to the space 29 by the rim of the valve 7, liquid fuel under pressure will have entered the metering chamber 12 via the drilling 21 and will have filled this chamber displacing, in so doing, the piston 14 against its return spring 15 until it encounters the stop 17. The metering chamber 12 will thus have become charged with fuel to the extent permitted by the longitudinal adjustment of the stop 17. Further rotation of the eccentric 10 will, at first, cause the rim of the valve 7 to expose the port 23 more, and so cause the degree of communication between the metering chamber 12 and the pressurized space 29 to be increased. Consequently an appreciable interval of time is allowed for the filling phase of the metering chamber 12 to be completed, if this has not already been accomplished by the time the valve 7 has reached the position depicted.

Continued rotation of the eccentric 10, however, causes the rim of the valve 7 to recede; that is to say, to move in such a direction as finally to close the port 23 from communication with the pressurized space 29, thus trapping the fuel which now completely fills the metering chamber 12. For a brief interval this fuel content remains trapped. During the course of that motion of the valve 7 last considered, however, the arcuate recess A2 performs a cycloidal motion, as indicated by the arrows R and R1 (Fig. 2), and, upon still further rotation of the eccentric 10, passes over the inner boundary of the metering block port 23. Simultaneously, or somewhat previous to this occurrence, the drilling B2 (associated with the port A2 in the valve 7), will have overlapped the delivery passage C3 supplying the injection nozzle N3. Thus, at the moment when the outer edge of the arcuate port A2 passes over the inner boundary of the port 23, the metering chamber 12 is placed in communication with the last-mentioned injection nozzle by way of the drilling 21, the port 23, the port A2, the drilling B2 and the delivery passage C3. Although the piston return spring 15 yields to the fuel pressure during the filling phase, it is quite capable of overcoming the back-pressure imposed by the injection nozzle, and now impels the piston 14 with the result that ejection of the contents of the metering chamber 12 commences, and fuel is discharged from the nozzle N3.

As the eccentric 10 rotates further from the position last considered, the arcuate port A2 is caused to overlap the port 23 more, which permits a substantial interval of time for completion of the travel of the piston 14, and, consequently, for the complete ejection of the contents of the metering chamber 12, this ejection phase terminating when the piston finally abuts against the end wall of the metering chamber.

Still further rotation of the eccentric 10 causes the arcuate port A2 to recede radially inwards until its communication with the port 23 is interrupted, this event being followed by uncovering of the outer boundary of that port by the rim of the valve 7, at which stage the pressurized fuel again has access to the metering chamber 12, and again depresses the piston 14 on to its stop 17, thus completing the cycle of filling and ejection for the particular metering chamber under consideration.

The diameter of the pitch circle of the teeth of the ring gear 9 is necessarily greater than that of the teeth 8 on the valve 7, and the ratio of these diameters is so chosen that the valve performs a rotary motion about its own axis appropriate to the sequence in which it is desired to place each metering chamber alternately in communication with the pressurized fuel supply and with one of the delivery passages. In the case of each of the examples illustrated, the ratio of the pitch circle diameters of the ring gear 9 and the gear teeth 8 is 9:8. Consequently, for each revolution of the driving shaft 11 the distributing valve rotates upon its axis through one-eighth of a revolution.

The cycle of operations now recommences, but with the difference that the valve port A2 now occupies the position formerly (and as shown in Fig. 2) held by the port A1, this transposition having come about by reason of the epicyclic creep of the valve 7 in conjunction with the circumstance that eight ports A1 . . . A8 are provided and, due to the 9:8 ratio provided by its gearing, the valve 7 will have crept backwards (that is to say, in a sense opposite to that of the eccentric rotation) by one-eighth of a revolution. It follows, therefore, that during the next cycle of operations following upon that already described, it will be the valve port A3 which comes into register with the metering block port 23. And, since the drilling B3 emerges from the port A3 at that end thereof opposite to the end at which the corresponding drilling B2 emerges from the port A2, communication will be established between the port A3 and the outlet point supplied by the delivery passage C1 instead of, as during the former cycle, corresponding communication having been established between the port A2 and the outlet point supplied by the delivery passage C3. Ejection of the contents of the metering chamber 12 will, therefore, take place during the cycle now under consideration to the injection nozzle N1 via the communications 21, 23, A3, B3 and C1.

Since now it is the valve port A4 which will, during the cycle following upon that just considered, come into register with the port 23 and, since the drilling B4 is located at the same end of the port A4 as in the case of the drilling B2 and the port A2, it follows that, during this last-mentioned cycle, ejection from the metering chamber 12 will revert to the injection nozzle N3. In this way, due to the alternate position of the drillings B1 . . . B8 with respect to the valve ports A1 . . . A8, the metering chamber 12 will eject its contents alternately to the injection nozzles N1 and N3. An identical sequence of operations is performed in respect of the metering chamber 13 which serves to eject fuel alternately to the injection nozzles N2 and N4. Since the two metering chambers 12 and 13, and their associated ports 23 and 24, are symmetrically disposed with respect to the motion of the valve 7, it follows that the intervals between the discharges of the four injection nozzles will be equal.

A final reference to the metering chamber 13 will serve further to elucidate the action of the whole unit. Since, in this case, as depicted, the valve port A5 has overrun the metering block port 24, communication between the valve drilling B5 and the delivery passage C4 has already been established, and, consequently the metering chamber 13 and the injection nozzle N4 are in communication. The ejection of fuel from this metering chamber is assumed to have been completed since the piston 14 is shown as having reached the extremity of its ejection stroke under the influence of its return spring 15.

It will be appreciated that the particular form of unit illustrated in Figures 1 and 2 constitutes a very convenient means of supplying fuel to, for instance, an internal combustion engine having four cylinders with equally spaced firing intervals, inasmuch as it is possible to effect the economy of employing only two metering chambers to serve four cylinders. It will be understood, moreover, that more than two metering chambers, each of them feeding two injection nozzles alternately, may be employed in an arrangement otherwise identical with that just described. For example, three equally spaced metering chambers, each with its associated parts, could be employed, and in this way an engine having six cylinders could conveniently be served.

Referring now to Figures 3 and 4, the unit shown has an epicyclic distributing valve 7A formed with a concentric series of eight equi-spaced identical ports E1 ... E8 which can be plain drillings as depicted, or can be of arcuate or other convenient shape. Inasmuch as they are spaced uniformly, these ports differ from the arrangement of the drillings B1 ... B8 of the corresponding valve 7 of Figures 1 and 2, a characteristic of which is the unequal spacing due to those drillings being located at alternate neighboring ends of the associated ports A1 ... A8. Apart from this difference, the construction of the two units is the same. In operation, owing to the epicyclic motion imparted to the valve 7A its ports E1 ... E8 are successively brought into register with the respective metering block ports 23 and 24, and can only establish communication between each of those ports and its associated delivery passage C1 or C2. These delivery passages supply the injection nozzles N1 and N2 respectively. Any desired number of metering chambers, each with its associated parts, may be employed, each, however, serving only one injection nozzle.

In the modified form of construction represented in Figure 5, the unit has a two-part casing 1A, 1B to which a metering block 3A is rigidly secured. This block not only contains the two metering chambers 12 and 13, with their associated parts similar to those already described, but has also drillings F1, G1 and F2, G2 which lead, via pipe connections P1 and P2 to the injection nozzles N1 and N2 respectively. Cooperating with the ported facing of the metering block 3A is an epicyclic distributing valve 7B, which is formed with a concentric series of eight equi-spaced blind ports H1 ... H8 of a shape appropriate for effecting the porting of the metering chambers 12 and 13 during their ejection phase. The valve 7B is maintained in contact with the metering chamber block 3A by the pressure exerted upon the exposed face of the valve by the fuel which enters at the inlet 27. It is preferable, however, to augment that pressure by a compression spring 31 associated with a pad 32 which is spigoted upon a boss 33 provided on the valve 7B and bears slidably upon the inner surface of the casing part 1A.

With the exception of the constructional differences pointed out above, the functioning of the unit illustrated in Figure 5 is the same as has been described in connection with Figures 3 and 4. Thus, as before, the metering chamber 12 is assumed to have completed its filling phase, the metering block port 23 having been amply uncovered to the pressurized fuel supply by the inward motion of the rim of the valve 7B. The other metering chamber 13 is depicted as having completed its ejection phase, and has been placed in communication with the injection nozzle N2 via the drilling 22, the port 24, the port H5 and the drillings F2 and G2.

It will be appreciated that the metering distributor and the fuel pump 25 could, if desired, be accommodated in a common casing so as to form a single unit. In that event the two components in question could be actuated by one and the same driving shaft.

A further manner of carrying the invention into effect is illustrated in Figures 6 and 7. As the unit in question constitutes a modification of that shown in Figures 3 and 4, it is unnecessary to repeat the description of the arrangement and functioning of the various parts common to the two units. Such parts bear the same references.

As shown in Figure 6, there is only the single metering chamber 12. Its plunger 14 is double-acting, and the ports 23 and 24 are connected, by the drilling 21 and a passage 34 respectively, to opposite ends of the metering chamber 12. The ports E1 ... E8 of the epicyclic distributing valve 7A ensure that as one end of the metering chamber is placed in communication with the pressurized space 29, the opposite end of the chamber is simultaneously, or somewhat previously, placed in communication with the delivery passage C1 or C2 in the valve seating provided on the casing of the unit. In this arrangement, therefore, one metering chamber serves the two injection nozzles N1 and N2. However, any desired number of metering chambers may be employed, each having the double-acting plunger 14.

Spring-loading, or other extraneous loading, of the metering chamber plunger or plungers is not necessary in this case since the admission of pressurized fuel alternately to either end of any particular metering chamber causes the associated plunger to be impelled by the fluid-pressure so as to eject the metered fuel from the opposite end of the chamber. The travel of each plunger and, consequently, the quantity of fuel ejected at each excursion, may conveniently be regulated in a similar fashion to that already described. As before, the adjustable stop 17 is situated at only one end of the metering chamber and, of course, appropriate measures are taken to preclude leakage of fuel where the stop emerges from the chamber.

What we claim is:

1. In a liquid fuel metering and distributing device, a casing having an intake port for communicating with a source of liquid fuel under pressure, a plurality of discharge ports, a plurality of metering chambers each having a reciprocable piston therein, a valving mechanism disposed between said chambers and said intake and discharge ports for bringing said chambers in a desired sequence alternately into communication with said intake port and a discharge port, means for operating said valving mechanism, the piston in each chamber being arranged for movement in one direction on a charging stroke by the pressure of the liquid fuel on one face thereof when said chamber is in communication with the intake port and thereby to permit fuel to accumulate in such chamber, counter-pressure exerting means acting on the opposite face of each piston and yieldably resisting movement of the same during said charging stroke, said counter-pressure exerting means being operative for moving the respective piston in the opposite direction through a discharge stroke when each said chamber is in communication with a discharge port, an adjustable stroke controlling means for each chamber for selectively varying the charging and discharging stroke of the piston therein, and a single control means operatively connected to all of said stroke controlling means for simultaneously varying the length of piston strokes as desired.

2. A liquid fuel metering and distributing device according to claim 1, wherein the adjustable stroke controlling means for each chamber is a screw threaded abutment member threadedly engaged in one end of the chamber and extending for a controllable distance into said chamber, one face of the piston in said chamber engaging said abutment member during piston movement in a given direction and thereby limiting the piston stroke.

3. In a liquid fuel metering and distributing device, a casing having an intake port for communicating with a source of liquid fuel under pressure, a plurality of discharge ports for supplying fuel to a corresponding number of cylinders of an internal combustion engine, a metering chamber having a reciprocable piston therein, a valving mechanism disposed between said chamber and said intake and discharge ports for bringing said chamber alternately into communication with said intake port and a discharge port, means for operating said valving mechanism, said piston being arranged for movement in one direction on a charging stroke by the pressure of the liquid fuel on one face thereof when said chamber is in communication with the intake port and thereby to permit fuel to accumulate in such chamber, counter-pressure exerting means acting on the opposite face of said piston and yieldably resisting movement of the same during said charging stroke, said counter-pressure exerting means being operative for moving the piston through a discharge stroke when said chamber is in communication with a discharge port, an adjustable screw threaded abutment member threadedly engaged in one end of the chamber and extending for a controllable distance into said chamber, one face of the piston in said chamber engaging said abutment member during piston movement in a given direction and thereby selectively limiting the charging and discharging stroke of the piston, and a control means operatively connected to said abutment member for rotating the latter to effect adjustment thereof independently of piston movement.

4. In a liquid fuel metering and distributing device, a casing having an intake port for communicating with a source of liquid fuel under pressure, a plurality of discharge ports, a ported disc valve mounted within the casing for rotary epicyclic motion and formed with a flat seating face, a metering chamber having one end open to the flat seating face of the valve, the valve being disposed between the metering chamber and said intake and discharge ports, a reciprocable piston in the chamber, pressure exerting means urging said piston during operation of the device toward said open end of the chamber, means for imparting epicyclic motion to the valve, the valve being adapted in its epicyclic movement to assume a first position opening a first passage for the admission of liquid under pressure to the metering chamber from said intake port, said piston being arranged to recede under the influence of entering liquid overcoming the force of said pressure exerting means, the valve being adapted in its movement alternately to assume a position other than said first position for opening a second passage for the flow of liquid from said metering chamber to one of said discharge ports, said pressure exerting means being arranged for urging said piston toward its former position to expel the liquid from said chamber in response to opening of said second passage, and means adjustable independently of reciprocation of said piston for determining the length of stroke of said piston, whereby the quantity of liquid expelled with each reciprocation of the piston is adjustable during operation of the device.

5. A liquid fuel metering and distributing device according to claim 4, wherein the independently adjustable means is a screw threaded member threadedly engaged in the end of the metering chamber opposite said one open end and extending for a controllable distance into said chamber, the piston upon receding coming to rest abutting said threaded member.

6. In a liquid fuel metering and distributing device, a casing having an intake port for communication with a source of liquid fuel under pressure, a plurality of discharge ports for supplying fuel to a corresponding number of cylinders of an internal combustion engine, a metering chamber having first and second compartments separated by a movable wall therebetween, said wall being free to move to expand either of said compartments and to contract the other of said compartments in response to an unbalance in liquid pressures on opposite sides thereof, first and second openings communicating respectively with said first and second compartments, a valving mechanism cooperatively associated with said openings and with said intake and discharge ports, means for operating said valving mechanism for bringing said intake port into communication with said first and second openings alternately and for concurrently bringing the other of said openings into communication with a discharge port, said valving mechanism operating means being adapted to operate in timed relation with a multicylinder internal combustion engine, and means for adjustably controlling the extent of movement of said movable wall during operation of said device, whereby each compartment upon alternately being placed in communication with the intake port will expand under the influence of the liquid pressure and be charged with fuel, and simultaneously the other of said compartments will contract and forcefully discharge its fuel contents through the discharge port.

7. In a liquid fuel metering and distributing device, a casing having an intake port and a plurality of discharge ports disposed in one end thereof, a ported valve mounted within the casing for rotary motion and formed with seating faces on opposite sides thereof, a metering block mounted for axial movement within the casing and having one surface adjacent one seating face of said valve and shaped complementary thereto, said valve being disposed between said block and said one end of the casing with its other seating face in contact with said end of the casing, resilient means disposed within said casing for urging said metering block axially toward said one end of the casing to maintain intimate contact between the casing, the valve, and said metering block, a metering chamber in said block having one end opening on said one surface, a reciprocable piston in the metering chamber, means for imparting motion to said valve, the valve being adapted to connect the open end of said metering chamber alternately to said intake port and one of said discharge ports, and means for causing the piston to reciprocate whereby a metered quantity of liquid is alternately received in said metering chamber and expelled through a discharge port.

8. In a liquid fuel metering and distributing device, a casing having an intake port and a plurality of discharge ports, a ported disc valve mounted within the casing for rotary epicyclic motion and formed with a flat seating face, a metering chamber having one end open to the flat seating face of the valve, a reciprocable piston in the chamber, means for imparting epicyclic motion to the valve, the valve being adapted in its epicyclic movement to control the admission of liquid to the metering chamber and to convey the liquid from the chamber to the discharge passages in the desired sequence and adjustable means for limiting movement of the piston within the chamber for varying the volumetric capacity of the chamber.

9. A liquid fuel metering and distributing device according to claim 8 wherein the adjustable means for limiting movement of the piston is a screw threaded member.

10. A liquid fuel metering and distributing device according to claim 8 wherein there are a plurality of chambers arranged around a common axis, each chamber having one end open to the flat seating face of the valve, a piston within each chamber and adjustable means for limiting movement of each piston for varying the volumetric capacity of the chamber and a common operating mechanism for simultaneously adjusting the means for varying the volumetric capacity of the chambers to the same amount.

11. A liquid fuel metering and distributing device according to claim 10 wherein each of the adjustable means for limiting movement of the pistons is a screw threaded member.

12. A liquid fuel metering and distributing device according to claim 10 wherein the common operating mechanism for simultaneously adjusting the screw threaded members consists of a pinion mounted on each screw threaded member and a gear in mesh with said pinions.

References Cited in the file of this patent

UNITED STATES PATENTS

| Number | Name | Date |
|---|---|---|
| 720,492 | Sedberry | Feb. 10, 1903 |
| 1,454,765 | Patterson | May 8, 1923 |
| 2,329,912 | Kent | Sept. 21, 1943 |